March 7, 1933. J. H. BRODERICK 1,900,540
ICE REMOVER FOR WINDSHIELDS
Filed Feb. 8, 1930
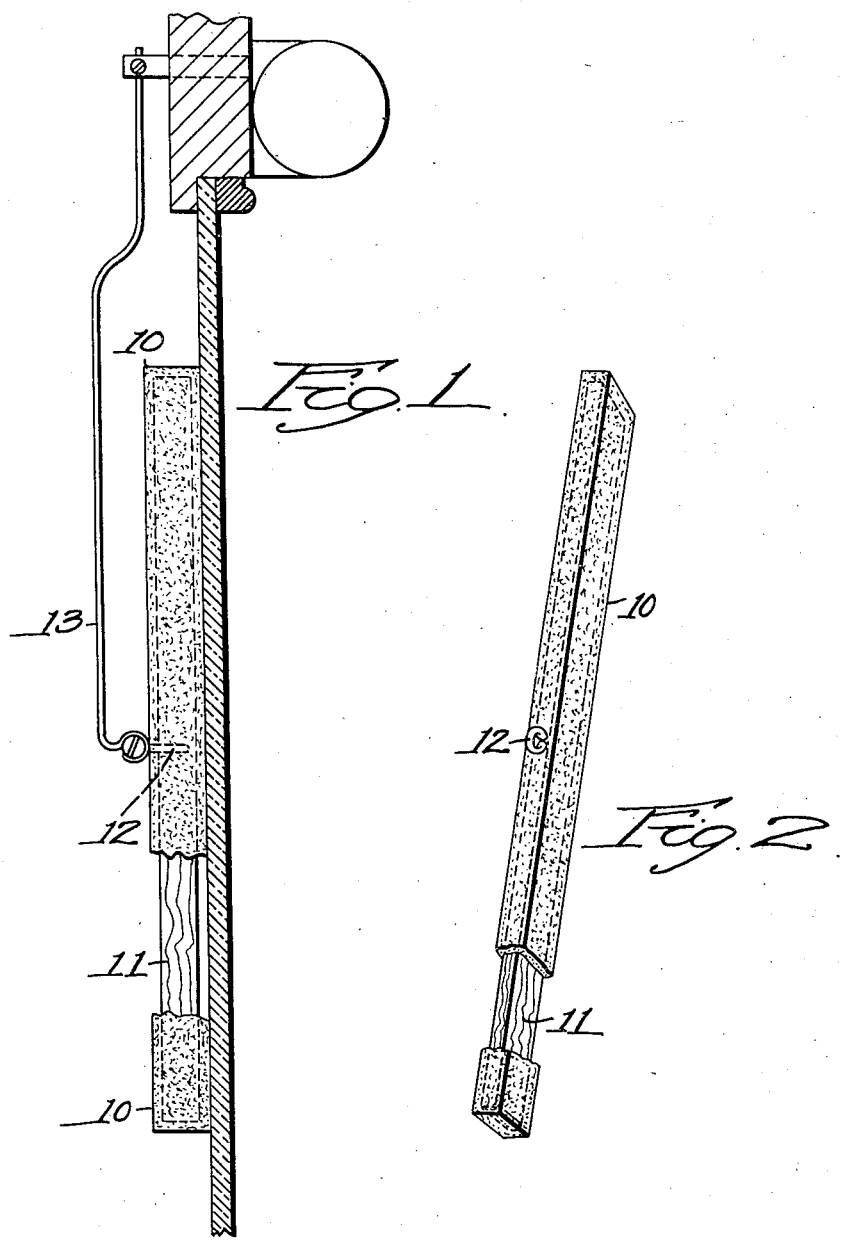
Inventor
John H. Broderick Patented Mar. 7, 1933

1,900,540

UNITED STATES PATENT OFFICE

JOHN H. BRODERICK, OF CLINTON, MASSACHUSETTS

ICE-REMOVER FOR WINDSHIELDS

Application filed February 8, 1930. Serial No. 427,007.

This invention relates to a device for melting ice from wind-shields of automobiles and is also capable of use for a similar purpose in other places.

The principal object of the invention is to provide an ice-remover which will be effective to melt and remove the ice without the application of external heat, and which will soften in the presence of the ice and water so that it will bear throughout a wide area on the glass and not scratch the same.

Other objects and advantages of the invention will appear hereinafter.

Reference is to be had to the accompanying drawing, in which

Fig. 1 is a side view of a wind-shield wiper mechanism with the ice remover applied thereto constructed in accordance with this invention, and Fig. 2 is a perspective view of a block of composition material constituting the main feature of the ice-remover.

This invention relates to a composition and a block of material made therefrom for attachment to any ordinary wind-shield wiper operating device. The composition is made for the purpose of melting the ice as it passes over its surface and removing it from an area. It is designed to soften in the presence of water on the wind-shield so that it will not scratch the wind-shield but will hug the surface of the glass closely and not only melt the ice but remove it in the same way as a rubber wiper would after it is melted.

The composition consists of salt and cement. The properties of salt for melting ice are well known. So far as I know, these properties have not been applied in any practical way for this purpose. In order to make a solid hard block of salt in which the salt is always on the surface so that it can act on the ice, I prefer to employ about five parts by volume of table salt and one part by volume of liquid or viscous Duco cement. They are mixed together to produce a plastic mass and then molded under pressure, preferably in the form of a block 10 of the same length as an ordinary wind-shield wiper. This block can be made solid or it can be made with a core 11 of wood on which the salt composition is molded. Preferably, a screw-eye 12 is molded into the mass screwed into the wooden core or it can be screwed into the side after the block is molded and from any side. The block is attached to the wind-shield wiper operating mechanism 13 such as is now in use, and can be applied to any of the types which are practical for operation with a rubber wiper.

The block 10, when dry, is hard and rigid but, as soon as it comes into contact with moisture, first the surface of it and then the whole block becomes softened. In fact, it is so soft that if the wooden core is not present, it can be bent by hand through a considerable arc without breaking. In passing over the glass therefore, it will not scratch it but, on the other hand, it will melt the ice as it moves slowly back and forth and push ahead of it the moisture and any unmelted ice which may be loosened from the wind-shield. It does not become soft enough to affect the cohesive qualities of the cement and there is no danger of its breaking up.

One of these blocks can be used a whole winter season without being used up enough to prevent its operation. Of course the salt is dissolved gradually on account of its action on the ice or on the water. If this action goes on long enough, the surface which is in contact with the glass will wear down to the wood and then it can be taken off and turned to bring another surface into contact with the glass. On account of the softening properties of the water, it can be used as an ordinary wind-shield wiper with very good effects but its principal use is for removing ice and it is intended to be put in position either in place of the usual rubber wiper or in association with it when the necessity for removing ice and sleet arises.

The Duco cement preferred is a solution or dispersion of nitrocellulose in organic solvents containing a plasticizing agent, such as camphor or the like. It will be understood that other kinds of cement than the one mentioned can be employed but I prefer a cement having a pyroxylin base on account of the fact that it will soften in the presence of moisture slightly and will retain its cohesive properties at the same time.

Although I have illustrated and described only one form of the article as used and specified only one definite composition, I am aware of the fact that other cements can be employed with the salt, and that the proportions can be changed, by any person skilled in the art without departing from the scope of the invention as expressed in the claims. Therefore, I do not wish to be limited in these respects, but what I do claim is:—

1. As an article of manufacture, a block adapted to be rubbed over a surface for the purpose of removing ice and sleet consisting of common salt and a pyroxylin cement and containing about 20 percent as much cement as salt by volume.

2. A movable ice remover for windshields comprising a wooden core and a body consisting of common salt and a pyroxylin cement comprising a preponderance of salt, said body surrounding the core and of material thickness.

In testimony whereof I have hereunto affixed my signature,

JOHN H. BRODERICK.